Nov. 12, 1963    H. STEUER    3,110,189
INFINITELY VARIABLE PULLEY GEAR
Filed Jan. 18, 1962    2 Sheets-Sheet 1

INVENTOR.
Herbert Steuer
BY
Bailey, Stephens & Huettig
ATTORNEYS

Nov. 12, 1963   H. STEUER   3,110,189
INFINITELY VARIABLE PULLEY GEAR
Filed Jan. 18, 1962   2 Sheets-Sheet 2

United States Patent Office 3,110,189
Patented Nov. 12, 1963

3,110,189
INFINITELY VARIABLE PULLEY GEAR
Herbert Steuer, Bad Homburg vor der Hohe, Germany, assignor to Reimers-Getriebe K.G., Ascona, Switzerland, a firm of Switzerland
Filed Jan. 18, 1962, Ser. No. 166,994
Claims priority, application Germany Jan. 25, 1961
5 Claims. (Cl. 74—230.17)

The present invention relates to an infinitely variable transmission of the type which comprises two pairs of conical pulley disks, a flexible driving member such as a belt or chain connecting these pulleys, and mechanical means for exerting the necessary axial bearing pressure upon the conical disks to transmit the frictional forces from the conical disks to the belt or chain or vice versa. The most preferred conventional transmissions of this type are provided with pressure-applying devices which permit axial contact pressures to be produced which are dependent not only upon the torque acting upon the particular shaft but also upon the particular transmission ratio to which the transmission has been set. This dependency upon the torque as well as upon the transmission ratio is of great advantage because it permits the axial bearing pressure always to be made of such a size that the belt or chain will be reliably prevented from slipping between the two sets of conical disks and also because these axial forces will then never be greater than absolutely required for transmitting the necessary frictional forces. The transmissions of this kind are generally provided with equal pressure-applying means on the driving and driven shafts since it often occurs that the direction of the driving torque changes, which means that the normal driving shaft becomes the driven shaft and vice versa.

A transmission of this type consists more specifically of a conical pulley disk on each shaft which is prevented by an end stop from yielding in the axial direction, and of a second conical disk on each shaft which is connected to the axially fixed disk so as to be nonrotatable but axially slidable relative thereto. The end surface of the hub of the axially movable disk is provided with several—usually three—cam tracks which are equally spaced from each other and each of which has a shape of two adjacent helical surfaces with an opposite pitch and different and changing inclinations. The shaft which carries these conical disks and is freely rotatable relative thereto is further provided with a cam ring which is nonrotatably connected thereto and provided on its annular end surface with cam tracks of the same shape as those on the hub of the axially movable pulley disks. The opposite cam tracks in the end surfaces of the hub of the axially movable disk and the cam ring are separated by rolling elements, for example, steel balls.

When a torque is taken off the driven shaft, the balls between the cam tracks will transmit the torque from the friction disks to the shaft. The balls are then located on the cam tracks in a position which depends upon the particular transmission ratio which is set up at that time. Simultaneously with the transmission of the torque, axial bearing pressures are, however, also produced which press the conical disks against the belt or chain. These axial forces are proportional to the torque which is taken off. Their absolute strength depends upon the tangential force which results from the torque and the pitch of the cam tracks at the particular point at which the balls are located at that time in accordance with the particular transmission ratio to which the gear is set. At the same time, the torque acting upon the driving shaft is transmitted in the same manner to the conical disks so that an axial bearing pressure is exerted thereon.

For maintaining a certain transmission ratio in the transmission according to the prior art, each set of conical disks is associated with a hydraulic piston which acts parallel to the mechanical pressure-applying device between the shaft and the axially movable disk thereon. The hydraulic pressure of this piston is controlled by a distributing slide valve which is connected to one of the axially movable conical disks. The helical surfaces of the cam tracks which extend in opposite directions to each other are inclined at such angles that the bearing pressures which are produced mechanically on the driven shaft are greater than the mechanically produced forces on the driving shaft. A particular transmission ratio can therefore be maintained only if the mechanical bearing pressures on the driving shaft are supported by hydraulic forces.

For the purpose of selecting a certain transmission ratio, that is, a certain position of the axially movable disks, the lever which connects the distributing slide valve to the conical disk is provided in the form of a two-armed lever the free end of which is arbitrarily adjustable.

If in a transmission which is provided with a mechanical pressure-applying device of the type as above described, the direction of the torque changes, while the direction of rotation remains the same, as it occurs, for example, in the transmission of a motor vehicle when the latter drives at first uphill at which time the engine drives the driving wheels of the vehicle through the transmission and when the vehicle then continues to drive downhill when the wheels of the vehicle drive the engine through the transmission and the engine then works as a brake, the balls of the pressure-applying device must disengage from one of each pair of helical surfaces of the cam tracks at the moment when the torque changes in direction and be applied against the opposite inclined helical surfaces of each pair of cam tracks. Each of the two shafts then carries out an angular movement relative to the pair of conical disks thereon. The extent of this movement depends upon the particular transmission ratio to which the transmission is set.

As the result of this angular movement and the impact of the balls upon the helical surfaces of the cam tracks at their new point of operation, impact stresses occur which may exert a destructive effect upon the transmission elements, especially if the torques are of a considerable size, apart from the fact that impact and rebound effects may then for a short time prevent entirely any power transmission between the conical disks and the belt or chain.

Although efforts have in the past been made to reduce these disadvantages by designing the cam rings so as to be axially slidable so that during their reversing movement they were acted upon by a spring to follow the balls which are rolling downwards along the cam tracks, while during the following upward movement of the balls to their new position, the cam rings were returned to their original position by being strongly retarded by mechanical or hydraulic means, these attempts were only able to reduce the mentioned disadvantages but never to prevent them entirely.

It is therefore the principal object of the present invention to overcome these disadvantages of the conventional pressure-applying devices of the type as described above, while maintaining all of their considerable advantages. More particularly it is an object of the invention to prevent the occurrence of any angular movements between the conical disks and the shafts when a reversal of the torque occurs so that all impact stresses will be avoided and the full bearing pressure will remain effective between the conical disks and the belt or chain even at such a time.

According to the present invention and in order to permit each of the two shafts to be alternately employed as a drive shaft and as a driven shaft, these objects are attained by a combination of the following features, namely, first, by providing each set of conical disks, that is, the driving and driven set, with a separate mechanical pressure-applying device for a given direction of rotation with cam tracks of only one pitch direction, and with a separate turning device which is actuated by the hydraulic control mechanism and acts in a direction opposite to the pitch direction of the mechanical pressure-applying device; second, by connecting the hydraulic turning device and the mechanical pressure-applying device of each set of conical disks, on the one hand, to the shaft and, on the other hand, to the rotatable and axially slidable disk of each set; third, by transmitting the respective torque on the driven set of disks only by means of the mechanical pressure-applying device from these disks to the shaft and on the respective driving set of disks solely by means of the hydraulic turning device from the shaft to the conical disks; and fourth, by making the necessary provision that on the driving set of disks a part of the tangential force which is produced in the hydraulic turning device by means of the control mechanism acts upon the mechanical pressure-applying device and by means of the latter produces an axially effective bearing force which through the belt or chain is held in a state of equilibrium with the axial force which is produced by the mechanical pressure-applying device of the driven set of disks.

Thus, while the transmission of the torque and the production of the bearing pressure on the respective driven set of disks are carried out by the same element, namely, the mechanical pressure-applying device, two different elements are provided for this purpose on the respective driving set of disks, namely, the hydraulic turning device for the transmission of the torque and the mechanical pressure-applying device for producing the bearing pressure. The mechanical pressure-applying device is arranged on the driving shaft in such a manner that the torque acts in a direction opposite to the direction of the natural effect of the cam track inclination. The tangential force which is active in the hydraulic turning device prevents, however, the balls from disengaging from the cam tracks and, by means of the control mechanism which traces the axial movement of the friction disk, it is made of such a size that the axial or bearing force which is produced by the inclination of the cam tracks corresponds to the respective load upon the transmission, which means that any undesired displacement of the axially movable friction disk and thus any undesired change in the transmission ratio will be prevented. Thus, when the direction of the torque changes, the balls remain in engagement with the cam tracks, the only difference being that the tangential force which effects this engagement is no longer produced hydraulically but is derived directly from the torque to be transmitted. The object of the present invention is thus attained. If the transmission should be selectively usable in either direction of rotation, the pressure-applying device is to be provided with cam tracks which are ascending in one direction for each direction of rotation. The turning device must then likewise be capable of transmitting torques selectively in either direction of rotation.

The hydraulic turning device may be of different constructions. Thus, for example, it may be made in the form of a rotary piston which consists of a number of partitions which are uniformly distributed over the periphery of the respective shaft and project radially therefrom, and of a housing which surrounds these partitions and is rotatable but fixed in the axial direction relative to the shaft and connected to the axially movable disk so as to be nonrotatable but axially slidable relative thereto. This housing is provided with a plurality of partitions corresponding to the number of partitions on the shaft and extending radially inwards. The two sets of partitions together with the shaft and the housing are associated with each other to form pressure chambers to which the pressure fluid may be supplied from the control element of the hydraulic control mechanism through longitudinal and radial bores in the shaft. The pressure of the pressure fluid prevailing in these pressure chambers thus produces a torque which is transmitted from the housing of the rotary piston directly to the axially movable disk. For this purpose, the connection between this disk and the housing of the rotary piston is also designed so that both of them are nonrotatably connected to each other but are capable of moving in the axial direction relative to each other. The axial bearing forces at the driving side of the gear are in this case produced solely by the mechanical pressure-applying devices in the manner as described.

In order to relieve the pressure-applying device on the respective driving shaft of these axially effective bearing forces, it has been found advisable to surround the housing of the rotary piston by a cylinder which is secured to the axially movable disk and is connected to the housing so as to be nonrotatable but slidable longitudinally relative thereto. The pressure chamber which is thus formed by the housing and the cylinder may then be supplied through a bore with the pressure fluid which is supplied to the pressure chambers of the rotary piston. This pressure fluid therefore also exerts an axial force upon the movable disk which supports the operation of the pressure-applying device of producing the necessary bearing forces.

A preferred embodiment of the turning device which may be very easily produced consists of a coarse screw thread on the shaft and of a threaded housing which is in mesh with the screw thread on the shaft and is rotatable and longitudinally slidable relative to the gear shaft. This threaded housing together with the shaft forms a closed cylinder chamber into which the pressure fluid is supplied through longitudinal and transverse bores in the shaft and which is connected to the axially slidable disk so as to be nonrotatable but axially slidable relative thereto. The housing may also in this case be surrounded by a cylinder which is secured to the axially movable disk and connected to the housing so as to be nonrotatable but longitudinally slidable relative thereto. The additional pressure chamber which is thus formed between the cylinder and the threaded housing is connected by a passage with the cylinder chamber so that the pressure fluid can flow from the latter into the additional pressure chamber and exert therein an axial force upon the movable disk in accordance with the strength of the pressure of the pressure fluid. Especially the pressure-applying device on the driving shaft is therefore partly relieved of the load of producing the axial bearing forces.

The objects, features, and advantages of the present invention will become more clearly apparent from the following detailed description thereof which is to be read with reference to the accompanying drawings, in which—

FIGURE 3 shows a view similar to the upper part of FIGURE 1 of one set of conical pulley disks and its associated elements according to a modification of the invention; while

Figure 3:
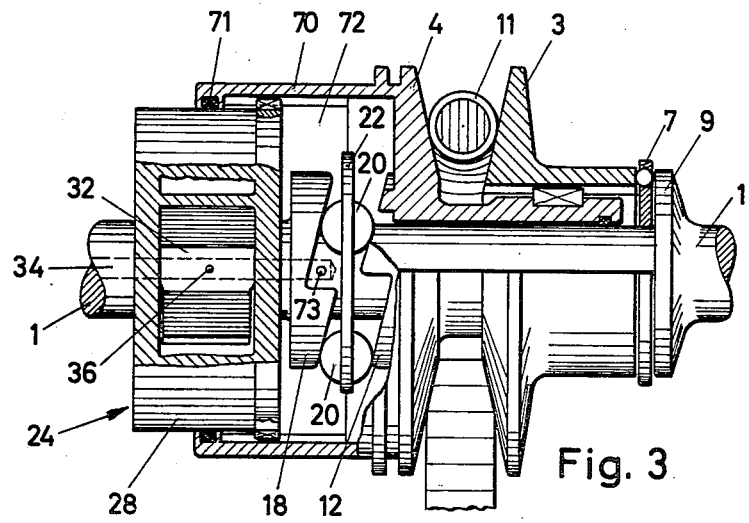
Figure 4:
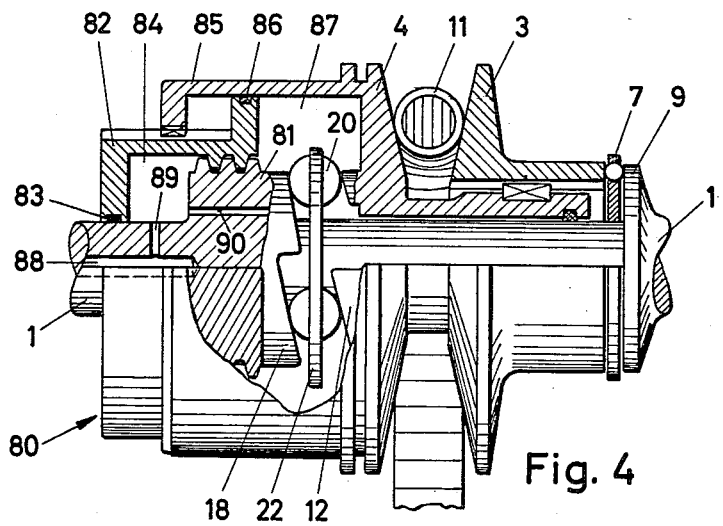
FIGURE 4 shows a view similar to FIGURE 3 of another modification of the invention.

The three preferred embodiments of the invention as illustrated in the drawings differ from each other merely by structural details of the rotary piston. Therefore, those parts in the drawings which are substantially similar to each other are identified by the same reference numerals. FIGURES 3 and 4 are to be read with reference to the lower part of FIGURE 1.

Figures 1, 2:
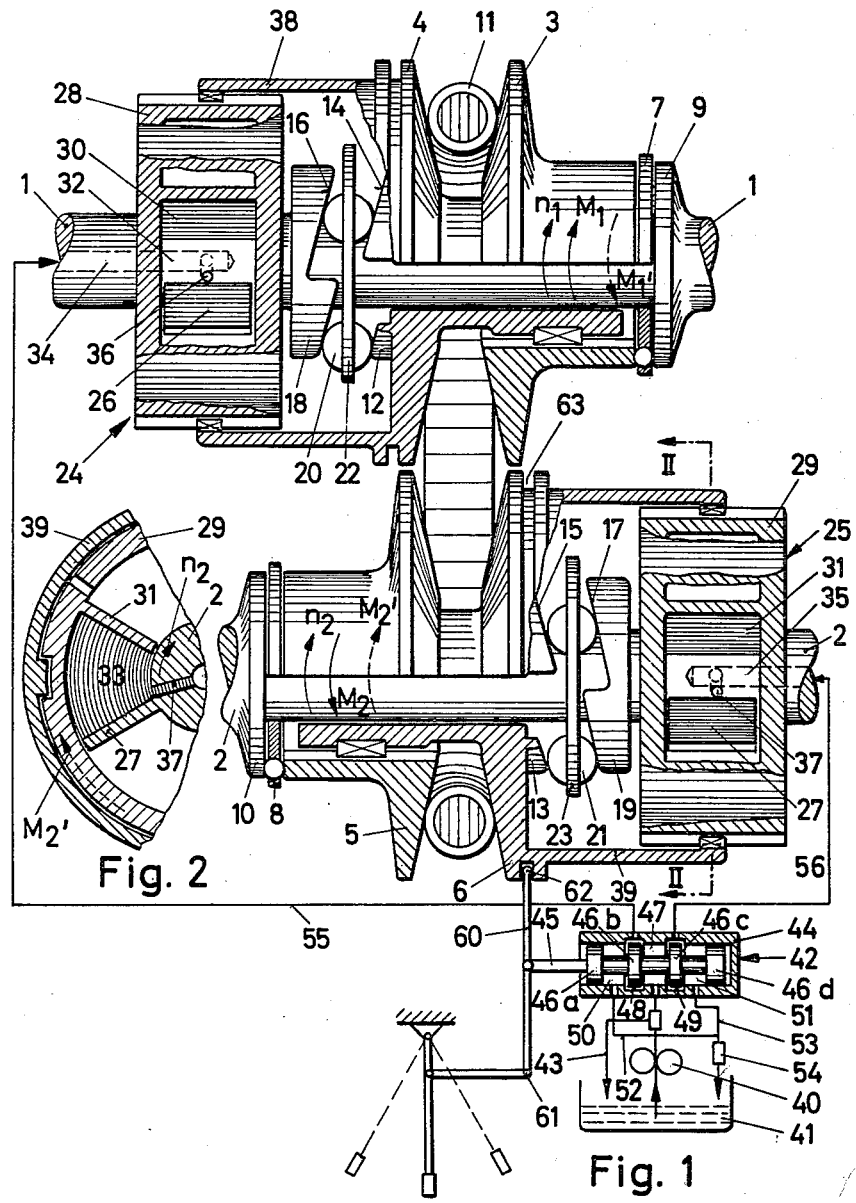
FIGURE 1 shows a diagrammatic illustration, partly in a longitudinal section, of a transmission according to a first embodiment of the invention.
FIGURE 2 shows a cross section taken along line II—II of FIGURE 1.

The infinitely variable transmission as illustrated diagrammatically in FIGURE 1 comprises two equal sets of conical disks 3, 4, and 5, 6 which are rotatably mounted in a housing, not shown. One set 3 and 4 of these disks is carried by a pulley shaft 1 and the other set 5 and 6 by a pulley shaft 2. Disks 4 and 6 are mounted on shafts 1 and 2 so as to be rotatable and axially slidable thereon, while disks 3 and 5 are mounted on the hubs of disks 4 and 6 and are nonrotatably connected thereto. Each disk 3 and 5 bears through a thrust ball bearing 7 or 8 against a flange 9 or 10 on the respective shaft and is thus prevented from yielding in the axial direction. The two sets of disks 3, 4 and 5, 6 on shafts 1 and 2 are connected to each other by an endless flexible driving member in the form of a link chain 11. The transmission ratio of such a transmission may be infinitely varied in a known manner by reducing the axial distance between disks 3 and 4 and by increasing at the same time the axial distance between disks 5 and 6 so that chain 11 runs between disks 3 and 4 along a larger radius and between disks 5 and 6 along a smaller radius, or vice versa.

The end surfaces 12 and 13 of the axially movable disks 4 and 6 are provided with cam tracks 14 and 15 of a helical shape of a varying pitch extending in one direction. Corresponding helical surfaces 16 and 17 are provided in the end surfaces of cam rings 18 and 19 which are rigidly secured to shafts 1 and 2. Balls 20 are inserted between the opposite cam tracks 14 and 16 on shaft 1 and balls 21 between cam tracks 15 and 17 on shaft 2. These balls are retained in position by a ball cage 22 or 23, respectively. In the particular embodiment of the invention as illustrated, the opposite end surfaces of the associated conical disks and cam rings are equally divided to form three of these cam tracks and therefore also contain three balls. The transmission as illustrated is designed for only one direction of rotation and the helical surfaces 14, 16 and 15, 17 therefore ascend only in one direction.

Each of shafts 1 and 2 also carries a rotary piston 24 or 25, respectively. As illustrated particularly in FIGURE 2, these rotary pistons have a plurality—in this case three—radially extending partitions 26 or 27 which are rigidly secured to shaft 1 or 2, respectively, and are enclosed by a housing 28 or 29 which closely surrounds partitions 26 or 27 and is, in turn, provided with radial inwardly extending partitions 30 or 31 which together with partitions 26 or 27 form pressure chambers 32 or 33 for a pressure fluid which is supplied into these chambers through longitudinal bores 34 or 35 and radial bores 36 or 37, respectively. FIGURE 1 illustrates that the pressure of the pressure fluid in chambers 32 exerts a torque in the direction of the arrow $M_1$ upon housing 28 of piston 24 on shaft 1. The size of this torque depends merely upon the size of the fluid pressure.

Each housing 28 of the rotary piston 24 on shaft 1 and housing 29 of piston 25 on shaft 2 is nonrotatably connected to the axially movable disk 4 or 6 by a connecting sleeve 38 or 39, respectively, which, however, is slidable longitudinally relative to housing 28 or 29, while the latter is mounted on shaft 1 or 2 so as not to be axially slidable relative to the rotary piston as merely indicated diagrammatically in FIGURE 1.

The hydraulic control mechanism of the transmission consists of a gear pump 40 which is adapted to draw a pressure fluid, for example, oil, from a container 41 and to feed the same to a distributing slide valve 42. This container 41 may at the same time form the oil sump of the infinitely variable transmission. The feed line between pump 40 and slide valve 42 contains a pressure relief valve which limits the maximum feed pressure of gear pump 40. Any excess in pressure fluid may then flow back to the oil sump through the return line 43. The distributing slide valve 42 consists of a cylindrical housing 44 in which a piston rod 45 with four pistons 46a to 46d is slidable in the longitudinal direction. Together with valve housing 44, these four pistons form three cylinder chambers. The central cylinder chamber 47 between pistons 46b and 46c is supplied with the pressure oil from pump 40. When the piston rod 45 is in its central position, each of the two pistons 46b and 46c is surrounded by an annular recess in valve housing 44 which is of a width slightly greater than the width of the respective piston. Therefore, when piston rod 45 is in this central position, the pressure oil entering into the central cylinder chamber may flow through the annular gaps at both sides of pistons 46b and 46c into the annular recesses 48 and 49 and then from the latter into the two lateral cylinder chambers 50 and 51 from which the oil may then return to the oil sump 41 through lines 52 and 53 in which a pressure relief valve 54 is inserted which is generally adjusted to a very small opening pressure.

The two annular recesses 48 and 49 are respectively connected by lines 55 and 56 to the central bores 34, 36 and 35, 37 in shaft 1 and 2 and thus to the pressure chambers 32 and 33 of the two rotary pistons. When piston rod 45 is in its central position, the pressure in pressure chambers 32 and 33 is determined by the particular setting of the pressure relief valve 54.

On the outer end of piston rod 45 a two-armed lever 60 is pivotably connected. One end 61 of this lever 60 is adapted to be moved back or forth from the outside, for example, by hand or by a servo-control mechanism, while the other end 62 engages into an annular groove 63 which is provided in the peripheral surface of the axially movable conical disk 6.

The manner of operation of the transmission as above described is a follows: Assuming that the transmission is in the position as illustrated in FIGURE 1, in which its transmission ratio is approximately 1:1, that piston rod 45 is in its central position, and that the transmission is driven on its shaft 1 in the direction of the arrow $n_1$, for example, by an engine, a torque will act upon this drive shaft 1 in the direction of the arrow $M_1$. The driven shaft 2 which is then rotated in the direction of the arrow $n_2$ is assumed to drive a machine which for this purpose requires a certain torque which will then act upon shaft 2 in the direction of the arrow $M_2$.

When a torque is being transmitted from the pair of conical disks 5, 6 to the driven shaft 2, a tangential force acts upon the cam tracks 15 and 17 whereby a bearing pressure is exerted from the conical disks upon chain 11 which is proportional to the torque and in accordance with the respective inclination of the helical surfaces of these cam tracks. Chain 11 is thereby moved radially outwards for a short distance between disks 5 and 6 which has the result that the chain will enter more deeply between the conical disks 3 and 4 on shaft 1. The axially movable disk 6 is thus moved in the axial direction toward the fixed disk 5. This axial movement of disk 6 is transmitted by the two-armed lever 60, which is pivotably connected at its end 62 to disk 6, to piston rod 45 which is thereby shifted toward the left in valve cylinder 44.

It may be pointed out at this time that the movements of the individual components relative to each other are extremely small and will produce practically no change in the transmission ratio of the transmission. Thus, for example, if piston rod 45 is shifted for only $\frac{1}{10}$ mm. toward the left in the manner as described, the flow of the pressure oil into the central cylinder chamber 47 of slide valve 42 will be shut off from entering into the annular recess 49, while at the same time the flow of the pressure oil into the annular recess 48 will be increased but its passage from recess 48 into the cylinder chamber 50 will be shut off by piston 46b which closes the annular gap between recess 48 and chamber 50. This has the result that in line 56 which leads from the annular recess 49 to the rotary piston on the driven shaft 2 only a low pressure remains which is essentially determined by the particular setting of the pressure relief valve 54. Line 55 which leads from the annular recess 48 to the rotary piston 24 on shaft 1, however, then contains a considerably increased pressure. This pressure which also becomes active in the pressure chambers 32 of the rotary piston produces a torque which tends to turn the housing 28 of the rotary piston relative to shaft 1 in the direction of arrow $M_1$, as indicated in FIGURE 1. This torque as supplied by the rotary piston 24 and the tendency of rotation therefore corresponds to the direction of arrows $n_1$ and $M_1$ on shaft 1. By means of the coupling sleeve 38 also the conical disks 3 and 4 on shaft 1 are rotated under the action of this torque in the direction of the arrows $n_1$ and $M_1$. Such a rotation relative to shaft 1 can, however, occur only if balls 20 of the pressure-applying device on shaft 1 will climb up along the cam tracks 14 and 16 so that the axially movable disk 4 will be shifted in the axial direction toward the fixed disk 3. This movement is, however, prevented by the chain 11 which runs between disks 3 and 4 and which already tends to enter more deeply between them as the result of the axial bearing pressure which is applied on the other shaft 2.

Thus, between the axial bearing pressure which is exerted upon the conical disk 6 and is produced on shaft 2 by the mechanical pressure-applying device 19, 21, 13, and the axial bearing force which acts upon the conical disk 4 through chain 11 a state of equilibrium is formed which is maintained by extremely small axial displacements of the movable disk 6 by means of the hydraulic control mechanism. On the driving side of the transmission, the full amount of the driving torque $M_1$ will then be transmitted directly to the conical disks 3 and 4 by means of the hydraulic force which acts in the pressure chambers 32 of the rotary piston. The purpose of the pressure-applying device on shaft 1 is solely to produce an axial bearing force which is equal to the spreading force which is exerted by chain 11 upon the disk 4 and which therefore maintains disk 4 in the particular axial position as required by the selected transmission ratio.

The rotary piston on shaft 2 is relieved of its load hydraulically even though—because of the pressure relief valve 54—a small residual pressure remains in its pressure chambers. The torque $M_2$ which acts from the driven machine upon shaft 2 is transmitted through the pressure-applying device 19, 21, 13 upon the conical disks 5 and 6, whereby at the same time an axial bearing pressure is produced which presses the conical disks 5 and 6 against the chain 11. The size of this axial pressure is determined by the torque $M_2$ which acts upon shaft 2, and also by the particular angle of inclination of the cam tracks 15 and 17 on which balls 21 engage at this particular moment. This specific location of balls 21, in turn, determines the position of chain 11 between the two pairs of disks 5, 6 and 3, 4 and thus the transmission ratio. The bearing pressure is therefore also dependent upon the particular selected transmission ratio.

Assuming that the torque $M_2$ acting upon the driven shaft 2 suddenly increases, for example, to twice its amount, the axial bearing pressure will also become twice as strong and, as the result of this greater axial pressure, chain 11 will then try to move radially outwardly between the disks 5 and 6. This, in turn, causes the axially movable disk 6 to shift toward the left, whereby a steep pressure increase immediately results in the rotary piston 24 since the piston rod 45 is then also moved toward the left. Thus, a considerably stronger torque acts upon the conical disk 4 with the result that disk 4 will tend to run ahead of shaft 1 and therefore also of the cam ring 18. Balls 20 then have the tendency to climb up on the cam surfaces whereby, in accordance with the increased spreading force of the chain, disk 4 will be pressed with great force toward disk 3 and will thus be braced. This only requires an extremely small displacement of disk 6 toward the left of the drawing before the equilibrium is reestablished between twice the amount of pressure on the driven shaft 2 and the increased torque demand on the driving shaft 1. The transmission ratio of the transmission then remains practically unchanged. Obviously, the same is true if the torque demands on shaft 2 diminishes.

An arbitrary change in the transmission ratio may be produced by moving the end 61 of the two-armed lever 60. If this end 61 is moved, for example, toward the left of the drawing, an increased pressure will be produced in the rotary piston 24 on shaft 1 with the result that the axially movable disk will be driven with a greater torque and will run ahead of the shaft and therefore be pressed by the pressure-applying device (when balls 20 run upwardly) toward the right with a greater force than previously with the result that the chain will run between disks 3 and 4 on the driving shaft along a larger radius and will enter more deeply between disks 5 and 6. The axial movement of disk 6 toward the right of the drawing also results in a return of the slide valve to its normal position so that, whenever a new transmission ratio is set up, a new state of equilibrium will be attained between the bearing pressure on shaft 2 and the counteracting force on shaft 1. Obviously, the same applies if the transmission ratio is changed in the other direction.

When applying such a transmission in actual practice it frequently occurs that the machine which is to be driven by shaft 2 and which exerts a braking force with the torque $M_2$ upon this shaft will suddenly start to drive the pulley on shaft 2. If the transmission is installed, for example, in a motor vehicle, the engine will drive the shaft 1 when driving uphill, while the driving wheels of the vehicle will be driven by shaft 2. If the vehicle thereafter runs downhill, the vehicle will drive the gear on shaft 2 and thus also the engine through shaft 1. The direction of the torque has therefore been reversed, shaft 2 has then become the drive shaft and the torque acts thereon in the direction as indicated in FIGURE 1 by the dotted arrow $M_2'$, while shaft 1 forms the driven shaft and a torque acts thereon in the direction of the dotted arrow $M_1'$. As the result of the arrangement and combination of the cam rings, the rotary pistons, and the hydraulic control mechanism, as previously described, the transmission according to the invention will in such a case operate as follows:

Shaft 2 and thus the cam ring 19 which is rigidly secured thereto tends to run ahead of the pair of conical disks 5 and 6 with the result that the balls 21 run for a short distance downwardly along the cam tracks 15 and 17. This permits the axially movable disk 6 to move toward the right of the drawing and chain 11 to enter slightly deeper between disks 5 and 6 so that it will then take up a larger radius between disks 3 and 4. In yielding toward the right on shaft 2, disk 6 takes along the two-armed lever 60 of the hydraulic control mechanism, whereby the flow of pressure oil from the cylinder chamber 47 to line 55 and thus to the rotary piston 24 on shaft 1 is shut off, while at the same time the pressure oil can enter into the annular recess 49 and thus flow to line 56 and to the rotary piston 25 on shaft 2. The pressure in the pressure chambers 32 of the rotary piston 24 on shaft 1 will thus drop almost to zero so that no further torque can be exerted by piston 24 upon disk 4 but the torque $M_1'$ will then be transmitted from shaft 1 through the cam ring 18 and balls 20 to disk 4. The pressure-applying device, while being in the same position as previously therefore now transmits the torque $M_1'$ of the driven side of the gear, while the rotary piston 25 which was previously not running under load on shaft 2, which now forms the drive shaft, transmits the torque to the axially movable disk 6. This conical disk 6 which is thus driven by the rotary piston tends to run ahead of the shaft so that balls 21 of the pressure-applying device on shaft 2 again tend to run upwardly on the cam tracks 15 and 17, whereby disk 6 will be shifted axially toward the left of the drawing and the chain 11, which previously had penetrated more deeply between disks 5 and 6, will again be pressed outwardly until a state of equilibrium is again attained between the bearing pressure, which is mechanically produced by the pressure-applying device 18, 20, 12 on shaft 1, and the bearing force which is produced by the rotary piston 25 and the pressure-applying means 19, 21, 13 on shaft 2. This operation, only required extremely small relative movements between the cam rings 18 and 19 on shafts 1 and 2 and the respective axially movable conical disks 4 and 6. At a reversal of the torques, the pressure-applying devices therefore do not have to travel such a long distance as in the conventional transmissions of this type which in some cases amounted up to 100° until they reached their new positions on inversely directed cam tracks. Consequently, the sudden impacts as occurred previously when the torques were reversed are also avoided. Furthermore, at such times the chain of a transmission according to the present invention also remains constantly under a bearing pressure which corresponds to the size of the torque and the selected transmission ratio.

FIGURE 3 illustrates one set of conical disks with its associated elements according to a modification of the invention which differs only in minor respects from the embodiment according to FIGURE 1. The connecting sleeve 38 between the housing 28 of the rotary piston and the conical disk 4, as shown in FIGURE 1, is in this embodiment replaced by a cylinder 70 which is secured to the conical disk 4 but is likewise connected to the piston housing 28 so as to be nonrotatable but axially slidable relative thereto. By means of a sealing ring 71, a pressure chamber 72 is formed in cylinder 70 which is closed at one side by disk 4 and at the other side by the piston housing 28. The pressure oil is conducted through the longitudinal bore 34 and the radial bores 36 in shaft 1 not only to the pressure chambers 32 of the rotary piston 24, but also through a further radial bore 73 to the pressure chamber 72. In this case, the oil pressure in the pressure chambers of the rotary piston 24 therefore produces a torque which is transmitted to the axially movable disk 4 in the same manner as previously described. At the same time, however, the oil pressure in the pressure chamber 72 also produces an axial force upon the movable disk 4 in the direction toward the fixed conical disk 3 with the result that, by the production of the bearing force acting upon disk 4, the pressure-applying device 18, 20, 12 will be partly relieved of its load. The same construction as just described applies of course not only to the elements on shaft 1 but also to those on shaft 2. The manner of operation of this embodiment is also the same as described with reference to FIGURES 1 and 2, except that in this case the pressure fluid also exerts on the respective driving side of the transmission an additional axial bearing force upon the movable conical disk in order to relieve the associated pressure-applying device partly of the load acting thereon.

A further modification of the rotary piston is illustrated in FIGURE 4 which also shows, partly in longitudinal section as in FIGURE 3, the set of conical disks and its associated elements on shaft 1. In this embodiment of the invention, the rotary piston 80 does not—as in the embodiments according to FIGURES 1 to 3—consist of pressure chambers which are formed by partitions projecting radially outwards from the shaft and associated partitions extending radially inwards from the piston housing, but of a coarse thread 81 on shaft 1 and a threaded housing 82 which is in mesh with thread 81 on the shaft and is also mounted on the shaft so as to be rotatable and axially slidable relative thereto, and which is also sealed by a gasket 83 relative to the shaft so that a pressure chamber 84 is formed. Similarly as in the embodiment according to FIGURE 3, the axially movable disk has again a cylinder 85 secured thereto to which the threaded housing 82 is connected so as to be nonrotatable but axially slidable relative thereto. Cylinder 85 is also sealed toward the outside by a gasket 86 and thus forms a further pressure chamber 87. The pressure oil which is supplied by the hydraulic control mechanism may enter into pressure chamber 84 through a longitudinal bore 88 and a radial bore 89 in shaft 1. This pressure chamber 84 in the threaded housing 82 communicates with the pressure chamber 87 in cylinder 85 through one or more bores 90. If the pressure in the pressure chambers 84 and 87 increases, for example, by a change in the position of the slide valve 45 (as shown in FIGURE 1), the threaded housing 82 will be moved toward the left in FIGURE 4 and will thereby be turned in a clockwise direction on the coarse thread 81 on shaft 1. This rotation is then transmitted through cylinder 85 to the axially movable disk 4 so that similarly as in the embodiments previously described a torque is transmitted also in this case from the rotary piston 80 directly to the axially movable disk on the respective driving shaft. Also similarly as in the embodiment according to FIGURE 3, the pressure in the pressure chamber 87 produces at the same time an axial force which partly relieves the pressure-applying means on the respective driving shaft of the load resulting from the bearing pressure which is exerted by them upon disk 4. The other set of conical disks with its associated elements on shaft 2 are of the same construction as above described and, except for the mentioned differences in the function of the rotary piston, the manner of operation of this transmission is also the same as described in detail with reference to FIGURE 1. This last-mentioned embodiment of the invention according to FIGURE 4 may be built and assembled relatively easily and it is therefore preferred in actual practice.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An infinitely variable transmission comprising a pair of shafts, each of said shafts adapted to serve alternately as a drive shaft and as a driven shaft, a pair of conical pulley disks on each shaft, one disk of each pair being rotatable and axially movable on one of said shafts and the other disk being connected to said first disk so as to be rotatable therewith but being axially fixed relative to said shaft, an endless driving member connecting said two pairs of disks, separate mechanical pressure-applying means for one direction of rotation of said shaft operatively connected with each axially movable disk and each pressure-applying means including elements operatively connected with one of such shafts and one of said axially movable discs, respectively, said helical surfaces having one pitch direction for producing axial forces bearing on said movable disk in the direction toward said driving member and said fixed disk in response to a load acting upon one of said shafts forming the driven shaft and to the prevailing transmission ratio of said transmission, hydraulic control means for selectively adjusting the transmission ratio of said transmission, separate hydraulic turning means one for each shaft regulated by said hydraulic control means and each including first and second parts relatively movable with respect to each other around the respective shaft axis in response to variations in pressure therebetween produced by said control means, said control means including a control element, means operatively connecting the control element to one of said axially movable discs for moving said control element in response to axial movement of such disc produced by changes in load on the driven shaft, the first of said parts of each hydraulic turning means being non-rotatably connected to the respective shaft so as to exert on the element of the pressure-applying means connected to such shaft a torque in a direction opposite to the pitch direction of the helical surface of such element upon an increase in pressure in said hydraulic turning means, the second part of each hydraulic turning means being non-rotatably connected to the axially movable disc of the respective pair, whereby a torque acting on the respective driven pair of disks is transmitted solely by said mechanical pressure-applying means from said disks to the associated shaft and whereby a torque acting on the respective driving pair of disks is transmitted solely by said hydraulic turning means from said shaft to said disks, a part of the tangential force produced by said hydraulic control means in said hydraulic turning means acting upon said mechanical pressure-applying means and by means of the latter producing a bearing force effective in the axial direction upon said axially movable disk, said bearing force being held through said flexible driving member in a state of equilibrium with the axial force produced by said mechanical pressure-applying means.

2. An infinitely variable transmission as defined in claim 1, in which the first parts of said hydraulic turning means comprise a pair of rotary pistons, each of said pistons being associated with one pair of said disks and comprising a plurality of partitions uniformly distributed on the periphery of one of said shafts and projecting radially therefrom, and the second parts each comprise a housing surrounding said partitions and rotatable but axially fixed relative to said shaft and connected to the axially movable disk on said shaft so as to be nonrotatable but axially movable relative thereto and a plurality of partitions extending radially inwards from said housing and corresponding to the number of partitions on said shaft, said partitions being associated with each other and with said shaft and said housing so as to form pressure chambers, said shaft having longitudinal and radial bores forming passages for supplying said pressure fluid from said control element of said hydraulic control means to said pressure chambers.

3. An infinitely variable transmission as defined in claim 2, further comprising a pair of cylinders each secured to the axially movable disk of one pair of disks and surrounding and connected to said housing of said rotary piston associated with said movable disk so as to be nonrotatable but longitudinally slidable relative thereto, said cylinder and housing together enclosing a pressure chamber, said shaft having at least one further bore forming a passage for supplying the pressure fluid also to said last pressure chamber so that the pressure fluid in said last pressure chamber will also exert an axial force directly upon said axially movable disk.

4. An infinitely variable transmission as defined in claim 1, in which each turning means associated with one of said shafts comprises a coarse screw thread on said shaft and a threaded housing in mesh with said screw thread and rotatable and longitudinally slidable relative to said shaft and together with said shaft forming a closed cylinder chamber, said shaft having longitudinal and transverse bores therein forming passages for supplying said pressure fluid into said cylinder chamber, said threaded housing being connected to said axially movable disk so as to be nonrotatable but axially slidable relative thereto.

5. An infinitely variable transmission as defined in claim 4, further comprising a pair of cylinders each secured to the axially movable disk of one pair of disks and surrounding and connected to said threaded housing so as to be nonrotatable but longitudinally slidable relative thereto, said cylinder and said threaded housing together enclosing a pressure chamber, and a passage connecting said cylinder chamber with said last pressure chamber for supplying the pressure fluid into said pressure chamber to exert an axial force directly upon said axially movable disk.

References Cited in the file of this patent
UNITED STATES PATENTS 2,550,180   Allen  _____ Apr. 24, 1951
2,993,385   Karig et al. _____ July 25, 1961